ATTORNEYS

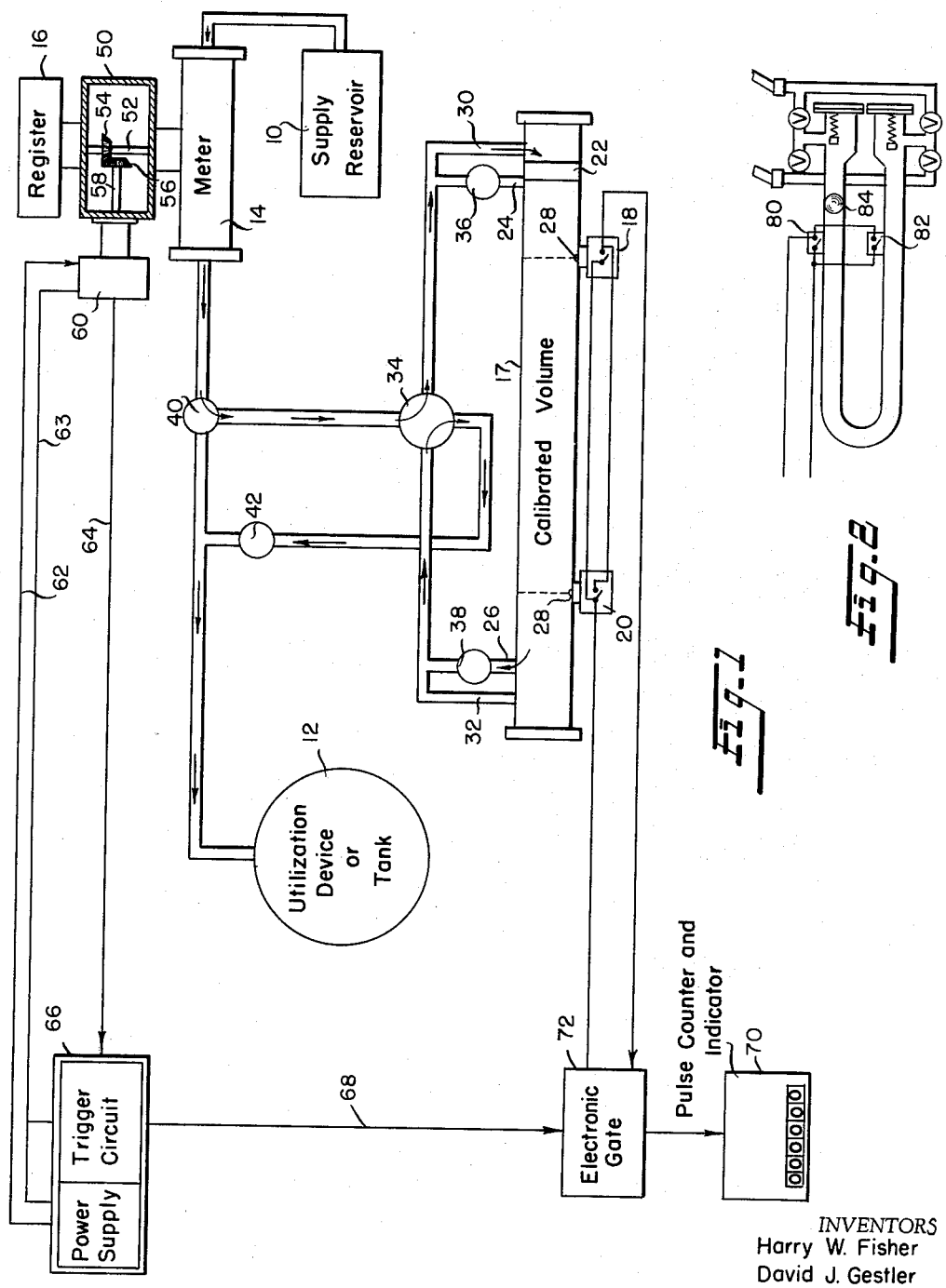
INVENTORS
Harry W. Fisher
David J. Gestler
Leo M. Walch, Jr.
BY
ATTORNEYS INVENTORS
Harry W. Fisher
David J. Gestler
Leo M. Walch, Jr.

INVENTORS
Harry W. Fisher
David J. Gestler
Leo M. Walch, Jr.

ATTORNEYS

United States Patent Office 3,254,523
Patented June 7, 1966

3,254,523
PULSE GENERATING APPARATUS
Harry W. Fisher and David J. Gestler, Pittsburgh, and Leo M. Walch, Jr., Verona, Pa., assignors to Rockwell Manufacturing Company, Pittsburgh, Pa., a corporation of Pennsylvania
Filed June 20, 1962, Ser. No. 203,982
12 Claims. (Cl. 73—3)

This invention relates to apparatus for producing a meter reading having a high degree of resolution by means of an electronic system which is supplemental to the usual meter register while the meter is actually on stream and running under normal operating conditions, and more particularly to a novel pulse generator and housing arrangement adapted to be interposed between the meter element and its register.

As pipe lines and meters handle an ever increasing quantity of fluids such for example as petroleum products, even the smallest error in meter accuracy will total up to a sizable amount over a long period of time. Also, where meters are used for controlling relative quantities in chemical processes, there is a continued need for the highest possible accuracy in the metering of the fluid flow under actual operating conditions.

The calibration of the meter in a piping system operating under normal conditions has been found to produce improvements in meter accuracy. Such a system may utilize a section of pipe line having a known volume with a piston-type pig launched in the line which causes a first trip switch to start registration at the beginning of the test pipe section and a second trip switch to stop the registration at the end of the test section to hereby make possible the comparison of the meter prover reading against the known volume of the section of pipe line.

It is a principal object of the present invention to provide improved apparatus for calibrating fluid meters, particularly of the turbine type by utilizing a system of the foregoing type while they are connected into a pipe line and operating under normal load conditions. Turbine meters of the type used commercially are characterized by a relatively slow turning rate of its output shaft, and it is the purpose of this invention to provide a novel means for providing a multiple number of pulses for each rotation of the shaft to produce a highly accurate electrical signal that is proportional to the fluid passing through the meter.

Another object of the invention is to provide a novel pulse generator assembly adapted to be interposed between the meter and its register for use in such calibrating metering systems.

Still another object of this invention resides in providing a novel pulse generator capable of producing on the order of 500 pulses per rotation of a spindle which extends along a flame proof path from the main meter housing and which in its preferred form embodies the use of a light source and photocell with a light interrupter for generating electrical impulses that are amplified by a transistor amplifier mounted in the pulse generator housing. The output pulses may be applied to auxiliary electronic equipment. The only electrical connections to the pulse generator housing are those providing the necessary operating voltage for the pulse generator and providing the connection to the auxiliary electronic equipment, and access to the electronic portion of the generator is through a cover plate that does not interfere with the meter operation.

These and other objects of the invention will become more fully apparent from the claims, and from the description as it proceeds in connection with the drawings wherein:

FIGURE 1 is a diagram of a prover system utilizing the novel pulse generator apparatus of the present invention;

FIGURE 2 shows an alternative form of a piston type prover having a calibrated volume with limit switches for operating the electronic gate in the system of FIGURE 1;

Figure 3:
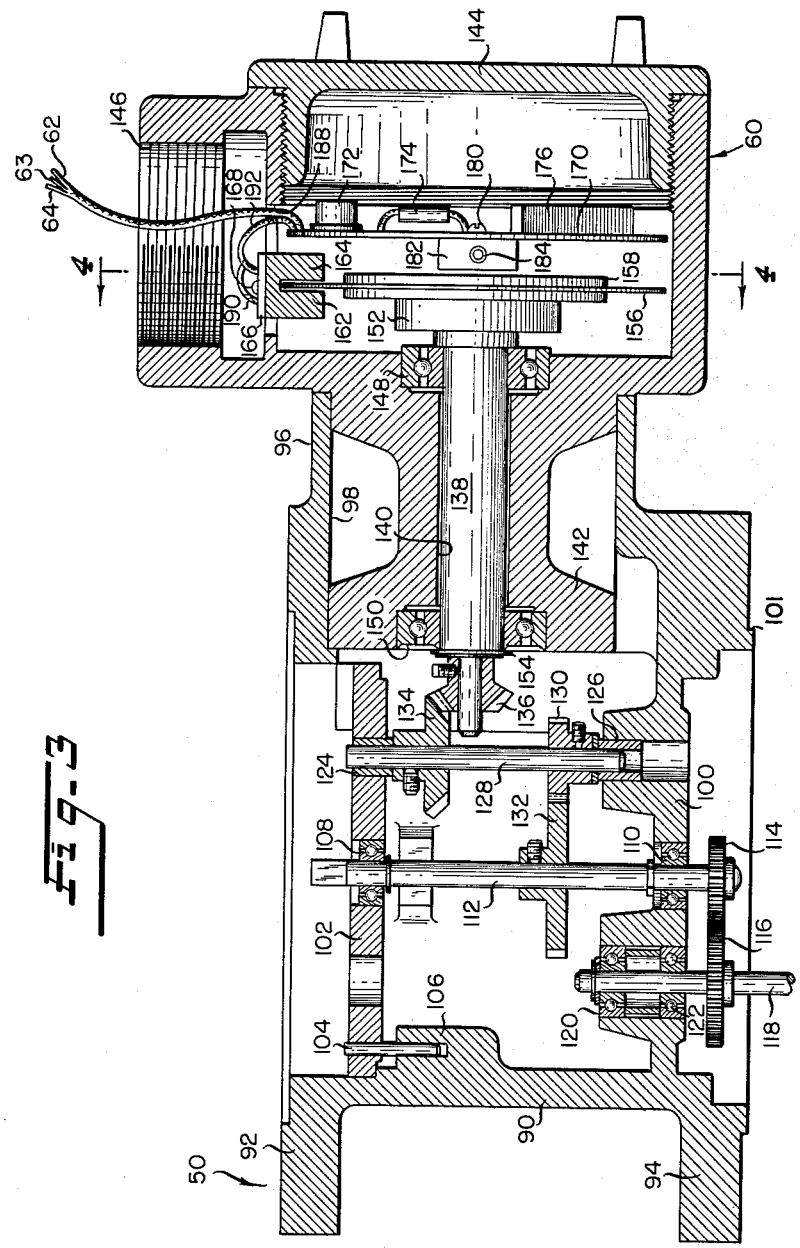
FIGURE 3 is a front elevation in section of a pulse generator in accordance with the present invention.

Referring now to the drawings, and particularly to FIGURE 1, the system of the present invention may include a supply reservoir 10 or other means for supplying a fluid to a utilization device or tank 12 through a meter 14 which conventionally is provided with a register 16 to indicate the total amount or volume of fluid passing through meter 14. To precisely calibrate meter 14 under operating conditions, an auxiliary section of piping is added to the system which includes a section of pipe 17 that has a calibrated or known volume between two limit switches 18 and 20. Pipe 17 may have a piston 22 which is movable between outlet pipes 24 and 26 across actuating members 28 to trip momentary switches 18 and 20. Piston 22 is moved by fluid which enters pipe 17 through conduit 30 or 32 depending upon the direction of fluid flow determined by valve 34. Valves 36 and 38 are provided to maintain piston 22 between the inlet conduits 30 and 32 to thereby permit the prover to be used for successive operations without manual movement of piston 22. The entire prover is connected into the pipe adjacent meter 14 through suitable valves 40 and 42 which permit selective operation of the prover when desired without interfering with the normal operation of the fluid system.

The pulse generating apparatus of the present invention includes housing 50 which is adapted to be interposed between meter 14 and register 16 and contains a central shaft 52 journalled in housing 50 which is driven by meter 14 and extends to drive register 16. A suitable gearing arrangement which may include bevel gears 54 and 56, is provided to drive spindle 58 that extends into housing 60 for the pulse generator. The operating power for pulse generator in housing 60 may be provided on line 62 and the electrical impulses from the pulse generator are provided on line 64 and applied to trigger circuit 66 of the auxiliary electronic equipment. A third line 63 is provided as a ground or common circuit connection. Trigger circuit 66 may be located within a 100 feet or so of the location of meter 14 and designed to provide electrical pulses of sufficient amplitude on line 68 to drive a conventional pulse counter or digital indicator 70 through an electronic gate 72. Pulse counter 70 and electronic gate 72 may be at a remote location and used in connection with the calibration of a large number of meters that may be located in one general area. If gate 72 and counter 70 are sufficiently close to the actual meter installation, the trigger circuit 66 may not be necessary.

Electronic gate 72 has another input from limit switches 18 and 20 on prover pipe 16. Gate 72 is opened when piston 22 crosses the first limit switch and is closed when the second limit switch is crossed. The pulses in the intervening time period are applied to counter 70 and the digital indication by the counter can then be compared with the known volume of prover pipe 16 to determine the accuracy of the meter.

In FIGURE 2 another form of pipe having a U-shaped calibrated volume between limit switches 80 and 82 is illustrated. These switches are adapted to be actuated by a ball 84 as it moves from one end of the pipe to the other. The direction of ball travel is reversible by changing the direction of fluid flow through the pipe.

Figure 4:
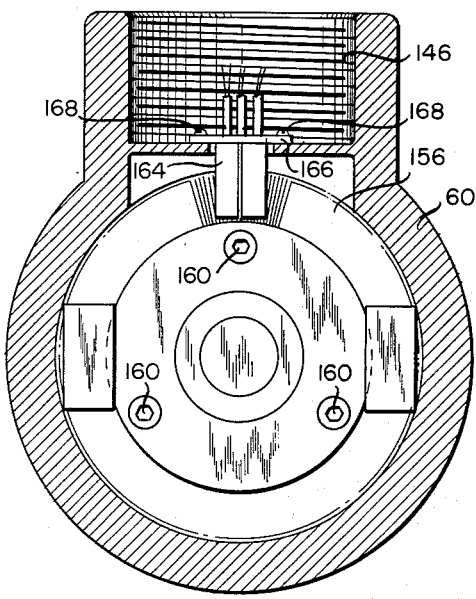
FIGURE 4 is an end elevation in section taken along line 4—4 of FIGURE 3.

The structure of the pulse generator in housings 50 and 60 of the present invention are shown in detail in FIGURES 3 and 4. Housing may be of the general type shown in copending application Serial No. 127,391 filed July 27, 1961, by Benjamin L. Binford and assigned to the assignee of the present invention. This housing is adapted to fit between the meter and register as diagrammatically indicated in FIGURE 1 and is provided with coupling elements for connection as indicated in the Binford application.

Housing 50 has a generally cylindrical wall 90 which terminates at its opposite ends in radial mounting flanges 92 and 94 and contains a radially projecting boss 96 which has a central circular bore defined by wall 98. The interior of housing 50 is a hollow chamber in communication with the hollow interior of the open ended boss 96. The bottom of housing 50 is closed by a transverse wall 100 and a boss 101 adapted for piloting engagement with complementary recesses upon the top of the housing of the meter. Suitable bolt receiving apertures may be provided in flanges 92 and 94 to secure housing 50 to the meter and to the register in a manner similar to that shown in the Binford application identified above.

A carrier plate 101 is mounted as by a plurality of pins 104 or screw fasteners upon internally projecting bosses 106 (only one of which is shown in FIGURE 3) within the interior of housing 50. Carrier plate 102 and transverse wall 100 support coaxial anti-friction bearings 108 and 110 journalling shaft 112 which extends substantially coaxially through housing 50. Shaft 112 projects at its lower end through bearing 110 and may have a gear 114 fixed thereto in constant mesh with a pinion 116 fixed to the output shaft 118 of meter 14. As is apparent from FIGURE 3, wall 100 supports a pair of anti-friction bearings 120 and 122 that provide upper bearing support for shaft 118. A suitable output coupling (not shown) may be attached to the upper end of shaft 112 for connection to a register.

A third set of bearings 124 and 126 are carried by plate 102 and wall 100 for journalling shaft 128 which is driven by pinion 130 in constant mesh with gear 132 on shaft 112. Shaft 128 also carries bevel gear 134 which is in constant mesh with bevel gear pinion 136 which is on the free end of spindle 138.

Spindle 138 is mounted to extend through a bore 140 in a boss 142 extending from housing 60. A central chamber in housing 60 is closed by lid 144. The upper side of housing 60 as shown in FIGURES 3 and 4 contains a threaded opening 146 through which leads 62, 63 and 64 (see also FIGURE 1) extend into housing 60.

One of the features of the present invention resides in making housing 60 an explosion proof housing. The chamber in housing 60 is isolated from the chamber in housing 50 by a flame path which extends along the length of spindle 138. This flame path is made fireproof by bore 140 having a maximum diametral clearance of 0.005 inch for a length of 2 inches and thus eliminates the danger of explosion due to an inadvertent electrical arc occurring in the chamber of housing 60.

After explosion proof housing 60 is machined, the two bearings 148 and 150 are lightly pressed into place. Drive spindle 138 with disk mounting hub 152 in place is next pushed through bearings 148 and 150 and locked in place by snap ring 154.

Disk mounting hub 152 is pressed on drive spindle 138 to be flush with the end of the spindle and is finished machined in this position to prevent run out of the disk mounting surface. After drive spindle 138 is in place, the light interrupting disk 156 can be carefully placed in position on mounting hub 152. Light interrupting disk 156 which may be a transparent or translucent plastic with opaque lines is then clamped in place by disk mounting plate 158 which is held as by three flat head screws 160.

A light block assembly which may be composed of a 6 volt light bulb and supporting socket in section 162 and a photocell in section 164 is provided in a rigid housing supported by base 166. Base 166 contains slotted apertures for reeciving fasteners 168, the slots being provided so that the light block assembly may be adjusted to prevent contact with the light interrupting disk 156 as the disk rotates.

Figure 5:
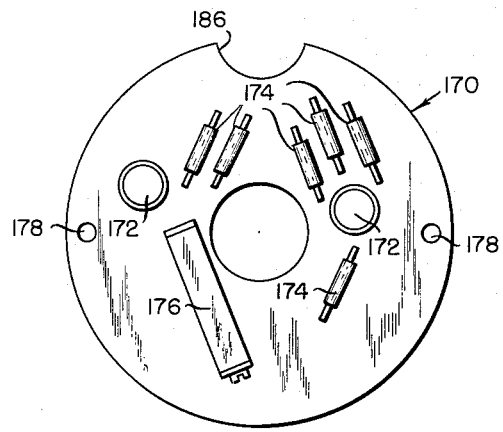
FIGURE 5 is a view of the printed circuit board mounted in the housing for the pulse generator apparatus.

An amplifier circuit is provided in the chamber of explosion proof housing 60 on a printed circuit board 170 shown in FIGURE 5 and may comprise a pair of transistors 172, a plurality of resistors 174 and an adjustable resistor 176, the purpose of the amplifier circuit being to amplify the electrical signal output from the photocell of the light block assembly. Printed circuit board 170 is provided with a pair of apertures 178 for receiving screw fasteners 180 which are threadedly received in mounting blocks 182 on diametrically opposed positions in housing 60. Mounting blocks 182 are secured in position as by fastener 184 and are positioned so that when amplifier board 170 is in place, a cut-out portion 186 on the amplifier board will be centered on a drilled hole 188 through which the electrical wires 62, 63 and 64 extend to reach amplifier board 170.

Soldering on amplifier board 170 is done with the board out of housing 160. This is easily accomplished by making the electrical leads 190 and 192 from the lamp and photocell about five inches long. After wiring, amplifier board 170 is mounted on mounting blocks 182 and the excess wire between the amplifier board and the light block can be pushed into the output hub 146 of explosion proof housing 60. Housing lid 144 can then be threaded into position and housing 60 is ready to slide into bore 98 of housing 50. Housing 60 may be secured to housing 50 by suitable screw fasteners (not shown) that extend through the walls of bore 98 and are threaded into the boss extension on housing 60.

Light interrupting disk 156 should have on the order of 500 opaque lines evenly spaced around its periphery to divide the rotation of spindle 138 into a large number of sub-divisions so that a fairly high count, on the order of 500 to 5000 pulses per barrel for example, can be achieved. The gear train for driving spindle 138 including gears 130, 132, 134, 136 also influences the number of electrical impulses per unit of measure as registered by the meter and by using gear trains which vary from 4 to 1 or 2 to 1 for example, light interrupting disks having 250 to 600 lines may be used to provide the desired degree of resolution in the counting system.

In one embodiment, an input of 6 volts D.C. was used to energize the light source and a photovoltaic cell was used to produce the output voltage. By means of a two-stage transistor amplifier on printed circuit board 170 and powered by the same 6 volt D.C. input, an output signal on lead 64 may be produced which has an amplitude of about 3 volts peak to peak.

Trigger circuit 66 may be of any suitable design. As it must be fairly close to the meter, it is desirably housed in an explosion proof box and may advantageously contain the power supply (which may simply be a transformer with suitable secondary windings and rectifiers) to provide the desired voltages for operation of the trigger circuit and to provide the 6 volts D.C. for use by the signal pulse generator. As such trigger circuits are well known in the art, a particular circuit is not here illustrated. The output signal from the trigger circuit may have a peak to peak magnitude of about 12 volts for transmission to gate 72 through cable 68.

Electronic gate 72 may include suitable input amplifier stages since the length of lead 68 may be on the order of thousands of feet long and contain a bistable circuit of any suitable type that may be set by a first incoming pulse and reset by the second pulse together with means for manually resetting the circuit. Such circuits are well known in the art for controlling the output of an amplifier to produce pulses on an output line only during the time that the bistable circuit is set. The output pulses from gate 72 as indicated by pulse counter 70 are used to compare the meter reading with the passage of a known volume of fluid and thus enable accurate calibration of the meter.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A pulse generator for providing an electrical digital output signal from a fluid meter having its own register operated by a shaft rotation proportional to fluid being metered, said generator comprising:
    (a) a housing adapted for a sealing connection onto an open side of the fluid meter at a position between said meter and said register, said housing having a transverse auxiliary portion extending out of the direct vapor path between said meter and said register;
    (b) a drive spindle in said housing;
    (c) means for driving said spindle in accord with rotation of the fluid meter shaft;
    (d) means inside said housing transverse auxiliary portion and responsive to rotation of said spindle for producing at least 250 electrical impulses for each revolution of said spindle;
    (e) a flame path separating said transverse auxiliary portion of said housing from the remainder of said housing, wherein said spindle extends along said flame path through a bore in said auxiliary portion providing a 0.005-inch maximum diametral clearance for a distance of at least 2 inches; and
    (f) electrical leads extending to the outside of said housing from said transverse portion.

2. The pulse generator as defined in claim 1 together with:
    (a) a trigger circuit located at a position remote from said housing and connected by said electrical leads with said impulse producing means for receiving electrical output pulses from said impulse producing means; and
    (b) a counting circuit connected to the output of said trigger circuit.

3. The pulse generator as defined in claim 1 wherein the electrical impulse means responsive to spindle rotation comprises:
    (a) a light source and photocell in the path of light from said source; and
    (b) a disk mounted on said spindle and having light interrupting portions extending into the light path between said light source and photocell to cause discrete electrical pulses to be produced by said photocell as said spindle rotates.

4. The pulse generator as defined in claim 3 wherein the electrical impulse means further comprises:
    (a) a printed circuit card mounted in said housing transverse portion and connected between said photocell and said electrical leads; and
    (b) electrical circuit components including current amplifiers and resistors on said card to provide output pulse of increased signal strength from said pulse generator.

5. The pulse generator as defined in claim 4 further including a pair of support members on the inside walls of said housing and wherein said printed circuit card is mounted on said support members in a plane parallel to the plane of rotation of said light interrupting member together with a removable cover for one side of said housing transverse portion adjacent said printed circuit board.

6. A pulse generator for providing an electrical digital output signal from a direct mechanically registering fluid meter comprising:
    (a) a housing;
    (b) a coupling shaft journalled on said housing;
    (c) said coupling shaft and said housing being adapted for operative interposition between an output shaft of a fluid meter and the input shaft of a mechanical register to establish a drive connection therebetween;
    (d) said housing having an auxiliary portion extending to one side of said housing and including a compartment;
    (e) a spindle extending in a direction transverse to the axis of said coupling shaft from said housing into said compartment;
    (f) means inside said compartment for producing at least 250 electrical impulses for each revolution of said spindle; and
    (g) a gear train connecting said spindle to be driven by the output shaft of the meter in parallel with the mechanically registering meter.

7. The pulse generator as defined in claim 6 wherein said housing and said auxiliary portion are separate parts connected by a flame path composed of tubular member having a bore through which said spindle extends, said bore providing a 0.005-inch maximum diametral clearance for a distance of at least 2 inches.

8. The pulse generator as defined in claim 7 wherein said tubular member is integral with said auxiliary portion and extends into said housing to support said auxiliary portion at a position between the meter and mechanical register.

9. A pulse generator for providing an electrical digital output signal from a turbine type fluid meter having its own mechanical register operated by a shaft rotation proportional to the fluid being metered, said generator comprising:
    (a) a housing adapted for connection onto an open side of the turbine meter;
    (b) a drive spindle in said housing with means for driving said spindle in accord with rotation of the turbine meter shaft, said means for driving said spindle including a drive shaft substantially parallel with the shaft driving said mechanical register and said spindle being transverse with said driving shaft;
    (c) a light source and photocell unit mounted inside said housing;
    (d) a member mounted on said drive spindle and having light interrupting portions extending between said light source and photocell to cause discrete electrical pulses to be produced by said photocell as said spindle rotates, said pulses being produced at a frequency determined by the rate of flow through said meter;
    (e) electronic amplifier means in said housing; and
    (f) electrical leads suplying energizing voltage to electrical components inside said housing and for providing electrical output pulses.

10. A pulse generator for providing an electrical digital output signal for a fluid meter comprising:
    (a) a housing adapted for connection onto an open side of a fluid meter having a mechanical register driven by said rotating shaft, said housing having a main body portion and a side compartment;
    (b) a drive spindle extending from said housing main body portion into said side compartment and means in said main body portion for driving said spindle in accord with rotation of said rotating shaft by means of a gear train including a further shaft disposed in parallel arrangement with said rotating shaft driving said mechanical register;
    (c) a light source and photocell unit mounted inside said side compartment;

(d) a member mounted on said drive spindle and having alternately disposed light transmitting and interrupting portions extending between said light source and photocell to cause discrete electrical pulses to be produced by said photocell as said spindle rotates, said pulses being produced at a frequency determined by the rate of flow through said meter;

(e) electronic amplifier means in said housing side compartment;

(f) a trigger circuit located at a position remote from said housing;

(g) electrical leads extending between said trigger circuit and the electrical components inside said housing side compartment of supplying energizing voltage to said components and electrical output pulses to said trigger circuit; and (h) a counting circuit connected to the output of said trigger circuit.

11. The pulse generator as defined in claim 10 together with an electronic gate connected between said trigger circuit and said counting circuit and means for opening and closing said gate in response to a predetermined volume of fluid passing through said meter.

12. A pulse generator adapted to be detachably mounted on a fluid meter for providing an electrical digital output signal from said fluid meter, said meter having its own register operated by a shaft in said meter which rotates proportional to fluid being metered, said generator comprising:

(a) a housing comprising a main body portion, a side compartment and a flame path chamber connecting said main body portion and said side compartment;

(b) means on said main body portion for detachably mounting said main body portion between said meter and said register;

(c) a spindle extending from said housing main body portion through said flame path chamber into said housing side compartment;

(d) means in said main body portion for operatively connecting said spindle to said meter shaft for rotation in proportion to the rotation of said shaft;

(e) means inside said side compartment and responsive to rotation of said spindle for producing at least 250 electrical impulses for each revolution of said spindle; and (f) electrical leads extending to the outside of said side compartment.

References Cited by the Examiner
UNITED STATES PATENTS

| | | | |
|---|---|---|---|
| 1,645,243 | 10/1927 | Judson | 73—272 |
| 1,871,404 | 8/1932 | Brown | 250—233 X |
| 1,880,105 | 9/1932 | Reifel | 250—233 |
| 2,623,389 | 12/1952 | Van Oosteron | 73—231 |
| 2,934,654 | 4/1960 | Pakan | 250—233 |
| 3,021,703 | 2/1962 | Pfrehm | 73—3 |
| 3,039,311 | 6/1962 | Bassett | 73—272 |
| 3,092,991 | 6/1963 | Thompson | 73—3 |

ISAAC LISANN, *Primary Examiner.*

S. S. MATTHEWS, *Assistant Examiner.*